United States Patent
Vendrow (10) Patent No.: US 8,855,273 B1
(45) Date of Patent: Oct. 7, 2014

(54) EMAIL TO FAX PROCESSING SYSTEM

(75) Inventor: Vlad Vendrow, Redwood Shores, CA (US)

(73) Assignee: Advanced Messaging Technologies, Inc., Los Angeles, CA (US)

( * ) Notice: Subject to any disclaimer, the term of this patent is extended or adjusted under 35 U.S.C. 154(b) by 496 days.

(21) Appl. No.: 13/235,084

(22) Filed: Sep. 16, 2011

(51) Int. Cl.
*H04M 11/00* (2006.01)

(52) U.S. Cl.
USPC .................. 379/88.13; 379/93.24; 358/400

(58) Field of Classification Search
CPC .................... H04N 1/00209; H04L 12/58
USPC ............. 379/100.08, 100.09, 100.13, 100.17; 358/402, 400
See application file for complete search history.

(56) References Cited

U.S. PATENT DOCUMENTS

| | | | | |
|---|---|---|---|---|
| 5,859,967 | A * | 1/1999 | Kaufeld et al. | ................. 726/5 |
| 6,104,500 | A | 8/2000 | Alam et al. | |
| 6,424,426 | B1 | 7/2002 | Henry | |
| 6,857,074 | B2 | 2/2005 | Bobo, II | |
| 6,914,693 | B1 | 7/2005 | Kirkeby | |
| 7,020,132 | B1 | 3/2006 | Narasimhan | |
| 7,050,188 | B1 * | 5/2006 | Yajima et al. | ............... 358/1.15 |
| 7,164,488 | B2 | 1/2007 | Henry | |
| 7,562,365 | B2 | 7/2009 | Dinh et al. | |
| 7,702,669 | B2 | 4/2010 | Vendrow et al. | |
| 2004/0114181 | A1 | 6/2004 | Kim | |
| 2004/0136513 | A1 | 7/2004 | Chiu | |
| 2009/0034015 | A1 | 2/2009 | Mulligan et al. | |
| 2009/0080029 | A1 | 3/2009 | Vendrow et al. | |
| 2009/0086278 | A1 | 4/2009 | Vendrow et al. | |
| 2010/0042523 | A1 | 2/2010 | Henry et al. | |
| 2013/0063762 | A1 * | 3/2013 | Mulligan et al. | ............ 358/1.14 |

OTHER PUBLICATIONS

Myers "Post Office Protocol—Version 3," Network Working Group, Request for Comments: 1939, STD: 53,, May 1996, 22 pages.

* cited by examiner

*Primary Examiner* — Creighton Smith
(74) *Attorney, Agent, or Firm* — Kenyon & Kenyon LLP (57) ABSTRACT

An email-to-facsimile (fax) processing system efficiently services requests issued by customers of the system in a fair and impartial manner. The system illustratively includes a plurality of components configured to provide email-to-fax processing services over a network. The components of the email-to-fax system include computer nodes executing software processes and/or services embodied as one or more FaxEmail routers, FaxEmail pollers, Rendering servers and Fax assemblers. The email-to-fax processing services provided by the components illustratively include email storage and retrieval services, email-to-fax conversion services and fax organizational transmission services. One or more of these services may be performed by the components in a randomized fashion to ensure that the customer requests, such as email-to-fax requests, may be fairly and impartially processed by the system.

26 Claims, 4 Drawing Sheets

EMAIL TO FAX PROCESSING SYSTEM

FIELD OF THE INVENTION

The present invention relates to email-to-facsimile (fax) processing and, more specifically, to efficient servicing of requests, such as email and fax processing requests, by an email-to-fax processing system coupled to a network.

BACKGROUND OF THE INVENTION

A facsimile ("fax") is a form of telegraphy wherein scanned materials, such as printed text and images, are converted into electrical signals and transferred over a telephone network by, e.g., fax machines connected to the network. Recent advances in technology have resulted in the provision of high-availability and reliable computing being delivered as a service, such as an email-to-fax processing service, over a computer network. A communication system may be configured to provide such computing ("cloud computing") to process email-to-fax requests received from the computer network into a format suitable for transmission over the telephone network. Here, emails is may be issued by one or more customers of the communication system connected to the computer network and converted by the system to a fax format for transmission over the telephone network.

Existing systems process email-to-fax requests in a deterministic manner; that is, the order in which requests are processed is defined by rules with predictable results. For example, a known communication system for processing email-to-fax requests uses a plurality of queues and logic circuitry configured to organize operations needed to maintain sequencing of packets or messages and accommodate latency between various data rates of processing resources in the system. The queues are also employed to allow the system to sequence messages, e.g., email-to-fax requests, issued by customers of the system until the processing resources are available. This implementation orders the requests such that they are accessed and processed in a first-in, first-out (FIFO) manner.

However, there are situations where a deterministic implementation is undesirable. For instance, a situation may arise where a particular customer having substantial service demands may effectively overwhelm the system with its requests. In this situation, a deterministic implementation, such as FIFO, may prioritize processing of that customer's requests to the detriment of other customer requests. That is, such an implementation may not allow the system to share the processing resources among the customers to thereby enable servicing of all requests in a fair and impartial manner.

SUMMARY OF THE INVENTION

The present invention provides an email-to-facsimile (fax) processing system that efficiently services requests issued by customers of the system in a fair and impartial manner. The system illustratively includes a plurality of components configured to provide email-to-fax processing services over a network. The components of the email-to-fax system include computer nodes executing software processes and/or services embodied as one or more FaxEmail routers, FaxEmail pollers, Rendering servers and Fax assemblers. The email-to-fax processing services provided by the components illustratively include email storage and retrieval services, email-to-fax conversion services and fax organizational transmission services. One or more of these services may be performed by the components in a randomized fashion to ensure that the customer requests, such as email-to-fax requests, may be fairly and impartially processed by the system.

According to one or more embodiments described herein, the FaxEmail router randomly accesses email headers from a maildrop on a public email server and forwards those headers to the FaxEmail poller. In response, the FaxEmail poller retrieves emails, including any attachments, associated with the headers from the maildrop and stores the attachments in a file server of the system. In addition, the poller stores the email headers as a first data set in a database of the system. The Rendering server retrieves the email headers in random order from the first data set and retrieves their associated attachments from the file server. The Rendering server then converts the attachments to faxes, stores the faxes in the file server and creates fax headers for storage in a second data set of the database. Thereafter, the Fax assembler retrieves the fax headers in random order from the second data set, retrieves their associated faxes from the file server and randomly organizes the faxes for transmission over the network.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
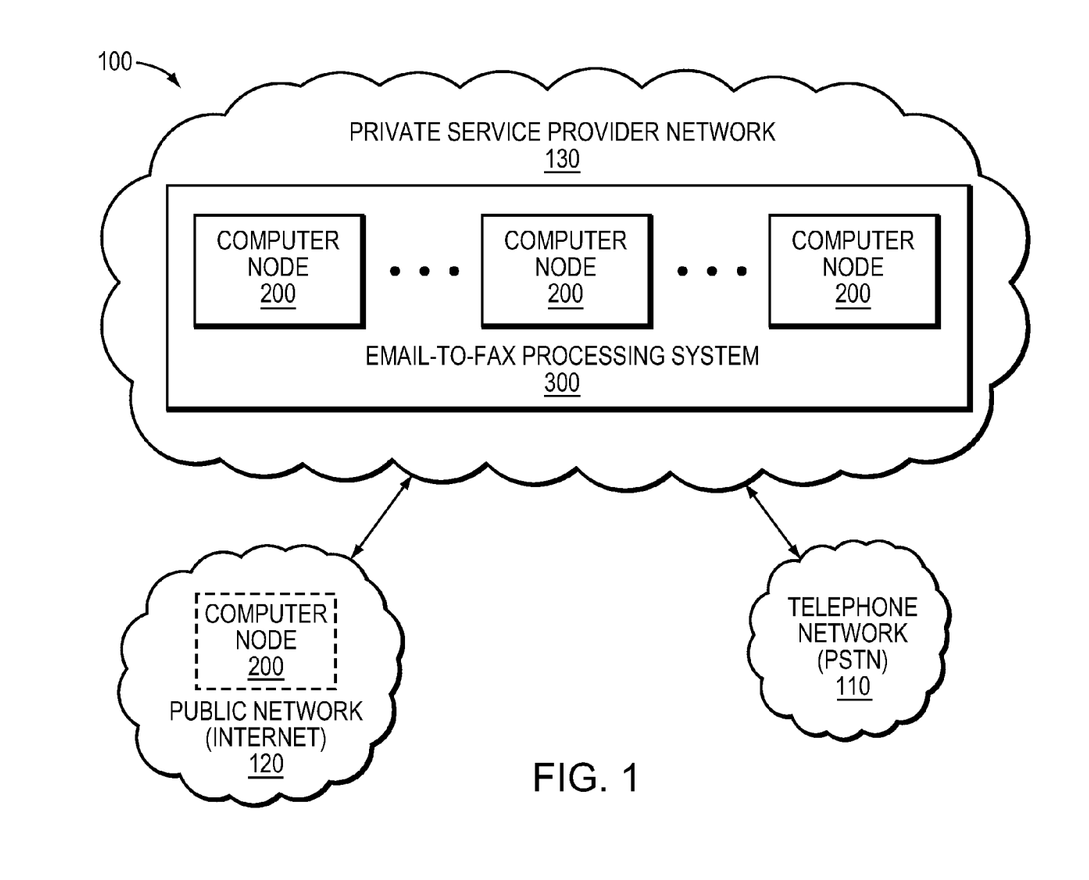
FIG. 1 is a schematic block diagram of a network environment that may be advantageously used with the present invention.

FIG. 1 is a schematic block diagram of a network environment 100 that may be advantageously used with the present invention. The network environment 100 illustratively includes a telephone network 110 coupled to computer networks organized as a public network 120, such as the Internet, and a private service provider network 130. The telephone network 110 is illustratively a circuit switched network, such as the public switched telephone network (PSTN), configured to transfer, inter alia, scanned materials, such as printed text and image data, transmitted by facsimile ("fax") machines connected to the network.

The computer networks 120, 130 are illustratively packet switched networks that include a plurality of network links and segments connected to a plurality of nodes, such as computer nodes and intermediate nodes. The network links and segments may include local area networks (LANs) and wide area networks (WANs) interconnected by intermediate nodes, such as routers, to form an internetwork of nodes. These internetworked nodes illustratively communicate by exchanging packets or messages according to a predefined set of protocols, such as the Transmission Control Protocol/Internet Protocol (TCP/IP) and Session Initiation Protocol (SIP), although it should be noted that other protocols, such as the HyperText Transfer Protocol (HTTP), may be advantageously used with the present invention.

Figure 3:
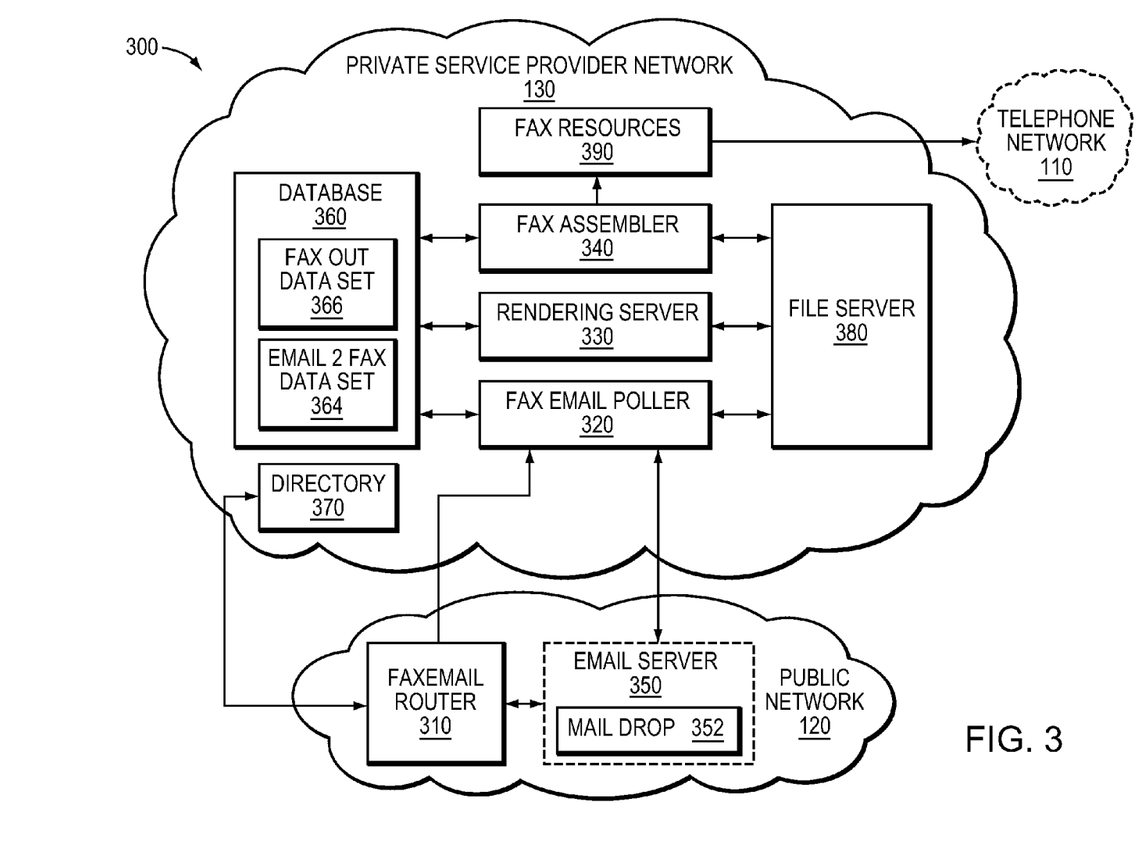
FIG. 3 is a schematic block diagram of an email-to-facsimile (fax) processing system in accordance with the present invention.

The private service provider network 130 may include a plurality of computer nodes 200 organized as an email-to-fax processing system 300 that is configured to service requests, such as email-to-fax requests, issued by its customers in a fair and impartial manner. The computer nodes 200 may be geographically dispersed and, as such, the private service provider network 130 may subscribe to one or more Internet service providers (ISP). The ISP typically owns a plurality of backbone networks that is may be used to interconnect the geographically dispersed nodes of the system and/or provide high-speed connectivity to the Internet.

Figure 2:
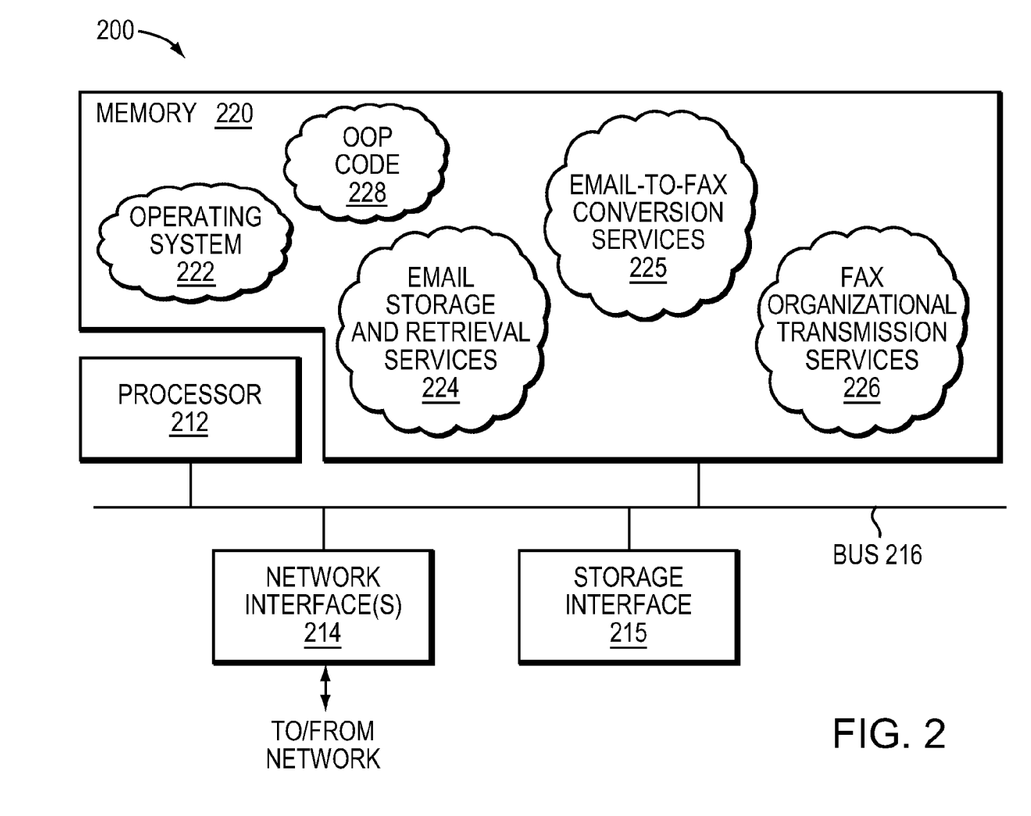
FIG. 2 is a schematic block diagram of a computer node that may be advantageously used with the present invention.

FIG. 2 is a schematic block diagram of a computer node 200, e.g., a general-purpose computer, that may be advantageously used with the present invention. The node 200 illustratively comprises a processor 212, a memory 220, one or more network interfaces 214 and, according to one or more embodiments described herein, a storage interface 215 interconnected by a system bus 216. Each network interface 214 contains the mechanical, electrical and signaling circuitry needed to connect the node to the networks to thereby facilitate communication over the networks. To that end, the network interface 214 may be configured to transmit and/or receive messages using a variety of communication protocols including, inter alia, TCP/IP, SIP and HTTP.

The memory 220 comprises a plurality of locations that are addressable by the processor 212 and the network interfaces 214 for storing software program code and data structures associated with the embodiments described herein. The processor 212 may comprise necessary elements or logic adapted to execute the software program code, such as object-oriented programming (OOP) code 228, and manipulate the data structures. An operating system 222 (e.g., a Unix or Windows operating system), portions of which are typically resident in memory 220 and executed by the processor, functionally organizes the node by, inter alia, invoking operations in support of software processes and/or services executing on the node. These software processes/services may include email storage and retrieval services 224, email-to-fax conversion services 225 and fax organizational transmission services 226 as described herein. It will be apparent to those skilled in the art that other types of processors and memory, including various computer-readable media, may be used to store and execute program instructions pertaining to the technique described herein. Also, while the embodiments herein are described in terms of software processes/services stored in memory, alternative embodiments also include those processes/services being embodied as modules consisting of hardware, software, firmware, or combinations thereof.

The storage interface 215 cooperates with the operating system 222 executing on is the computer node to access data served by one or more of the components of the system. To that end, the storage interface 215 includes input/output (I/O) interface circuitry that couples to storage devices (not shown) over an I/O interconnect arrangement to provide data storage facilities for use by the components of the email-to-fax system 300. The data served by the node 200 may be stored on any type of attached array of writable storage device media, such as video tape, optical, DVD, magnetic tape, bubble memory, electronic random access memory, micro-electro mechanical and any other similar media adapted to store information, including data.

As noted, a communication system may be configured to process email-to-fax requests received from a computer network into a format suitable for transmission over a telephone network. The communication system may be further configured to process these requests in accordance with a deterministic implementation that involves the use of one or more queues. Such an implementation processes or services the requests in an ordered manner, i.e., in the order in which the requests are received (FIFO). However, situations may arise where a deterministic implementation is undesirable, such as when a particular customer having substantial service demands may effectively overwhelm the system with its requests. In this situation, a deterministic implementation, such as FIFO, may prioritize processing of that customer's requests to the detriment of other customer requests. That is, the deterministic implementation may not allow the system to share the processing resources among the customers to thereby enable servicing of all requests in a fair and impartial manner.

Email-to-Fax Processing System

The present invention provides an email-to-fax processing system that efficiently services requests issued by customers of the system in a fair and impartial manner. FIG. 3 is a schematic block diagram of the email-to-fax processing system 300 that may be advantageously used with the present invention. The system 300 illustratively includes a plurality of components configured to provide email-to-fax processing services over a network, such as telephone network 110 and computer networks 120, 130. The email-to-fax processing services provided by the components may include email storage and retrieval services, email-to-fax conversion services and fax organizational transmission services. The components of the system illustratively include computer nodes 200 executing software processes and/or services embodied as one or more FaxEmail routers 310, FaxEmail pollers 320, Rendering servers 330 and Fax assemblers 340. According to one or more embodiments described herein, the components may further include nodes 200 executing software processes and/or services embodied as data storage facilities, such as database 360, directory 370 and file server 380.

The high availability and low-cost of IP cloud computing resources may influence the deployment of certain of these components within various networks. For instance, in an illustrative embodiment, the FaxEmail router 310 may be hosted and maintained by third party providers and made accessible over the public network 120, while the FaxEmail poller, Rendering server and Fax assembler are hosted and maintained within the private service provider network 130. One example of a third party, cloud-based provider of computing services is Amazon Web Services™.

In addition, the data storage facilities, such as database 360, directory 370 and file server 380, may be hosted and maintained in the private service provider network 130 in order to ensure privacy, security and efficient servicing of the data stored therein. For example, data may be organized in database 360 as collections of related data ("data sets"), e.g., Email2Fax data set 364 and FaxOut data set 366, to facilitate efficient access and manipulation by components of the email-to-fax system 300 when serving requests issued by customers, as described herein. Alternatively, the FaxEmail router 310 may be hosted and maintained within the private service provider network 130, while the directory 370 (which may contain less sensitive data than that stored in other storage facilities such as database 360) may be hosted and maintained outside of the private service provider network 130 and made accessible through the public network 120, such as through a third party provider.

Email storage and retrieval services 224 contain computer executable instructions executed by processor 212 to perform functions provided by the FaxEmail router 310 and is the FaxEmail poller 320. Illustratively, these functions may be configured to access a maildrop 352 on an email server 350 of public network 120. The email server 350 may be any type of electronic mail server capable of receiving emails over the public network 120. For example, the email server 350 may be an electronic mail server that supports Post Office Protocol—Version 3 (POP3). POP3 is well-known and described in more detail in Request for Comments (RFC) 1939, entitled "Post Office Protocol—Version 3," dated May, 1996. The email server 350 receives requests from customers to transmit faxes. In one embodiment, a customer may issue such a request by sending an email to the email server 350. The email request may include, inter alia, the identity of a recipient of the fax transmission (e.g., a destination telephone number embedded in a recipient field of the email request). The email request may also include one or more attachments that make up the body of the fax. For example, the email request may include a file stored in the Portable Document Format (PDF) that contains images to be sent as the fax transmission.

The router 310 and poller 320 may access the maildrop 352 by exchanging messages, such as commands and responses, in accordance with POP3. In an illustrative embodiment, POP3 may used by the FaxEmail router 310 and the FaxEmail poller 320 to retrieve email headers and associated emails in a randomized fashion to ensure that the customer requests may be fairly and impartially processed by the system 300. Yet, those skilled in the art will understand that other messaging protocols, such as HTTP, Internet Message Access Protocol (IMAP), Simple Mail Transfer Protocol (SMTP) and/or Simple Object Access Protocol (SOAP), may be advantageously used with the present invention. Similarly, these same messaging protocols may be used by customers of the system to send email requests to the email server 350.

Email-to-fax conversion services 225 contain computer executable instructions executed by processor 212 to perform functions provided by the Rendering server 330. Illustratively, these functions may configure the Rendering server to process email headers in a randomized fashion. As described herein, the Rendering server 300 cooperates with the data storage facility components, such as database 360 and file server 380, to service customer requests by converting emails and attachments associated with is the email headers to fax files in a fair and impartial manner.

Fax organizational transmission services 226 contain computer executable instructions executed by processor 212 to perform functions provided by the Fax assembler 340. These functions may be configured to randomly organize the faxes for transmission over the networks. In an illustrative embodiment, the faxes may be transmitted over the telephone network 110 as well as the public network 120 and private service provider network 130 in accordance with well-known fax protocols, such as the T.30 and T.38 protocols, respectively. In this way, the faxes may be received by, among other things, traditional fax machines connected to an analog telephone network.

Operationally, the FaxEmail router 310 iterates through email headers retrieved from maildrop 352 on email server 350 in a randomized fashion. For example, the router may query the server 350 as to the amount of emails present in the maildrop and may then randomly access all of the email headers. Alternatively, the router may randomly access n email headers in the server 350, where n is less than the number of emails present in the maildrop 352. In an illustrative embodiment, the randomized access employed by the FaxEmail router 310 may be realized using a random number generation (RNG) function of OOP code 228, such as C++, executable by processor 212. The RNG function, e.g., RNG (x,y), preferably produces values between x and y, inclusive, with an (ideally) uniform probability distribution and appearance of randomness or white noise. The RNG function parameters x and y are illustratively dependent upon the environment within which the invention operates. That is, the parameters are illustratively dependent upon the operating environment of the email-to-fax system 300. For example, in an environment wherein the amount of emails, including email headers, present in the maildrop is twenty-five (as indicated by the email server 350), the FaxEmail router 310 may sequentially assign each of the twenty-five email headers a number between 1 and 25. The router 310 may then invoke the RNG function to retrieve a predetermined number of random values, e.g., twenty-five (25) values, between x=1 and y=25, inclusive. That is, the router may retrieve the random values returned by the function, whereby the retrieved values identify the random order in which the email headers are is accessed.

The FaxEmail router 310 also queries the directory 370 to determine an address of the FaxEmail poller 320 for receiving and processing the headers. According to one or more embodiments described herein, processing of emails headers by poller 320 is determined by, e.g., the email address of the customer (sender). Since the router 310 is illustratively hosted within the public network 120 while the directory 370 is hosted within private service provider network 130, the FaxEmail router 310 preferably queries the directory 370 using a public IP address. As an alternative embodiment, the FaxEmail router 310 may be hosted within the private service provider network 130 and the directory 370 may be hosted within the public network 120, where the directory is queried using a public IP address. If the sender's email address is not stored in the directory 370, the sender is not known to the system and the email header(s) are discarded (dropped). However, if the sender's email address is stored in the directory, the FaxEmail router 310 forwards the randomly accessed email headers to the FaxEmail poller 320 using, e.g., a public IP address of the poller.

In response, the FaxEmail poller 320 retrieves emails, including any attachments, associated with the headers, from the maildrop 352 (preferably in the random order forwarded by the router 310) and stores the attachments in file server 380 of system 300. In addition, the poller 320 stores the email headers as a first data set, e.g., the Email2Fax data set 364, in database 360. The email headers are illustratively stored as a data set to enable efficient access and manipulation by the components of the system 300, such as the Rendering server 330. That is, the organization of email headers as a data set (as opposed to a queue) enables the Rendering server 330 to efficiently retrieve the headers, i.e., in random order. After retrieving the emails (including any attachments), the FaxEmail poller 320 may delete the retrieved emails from the email server 350.

In an illustrative embodiment, the Rendering server 330 monitors (e.g., periodically) the data set 364 and, upon discovering the newly-stored email headers, processes those headers in random order to ensure fair and impartial conversion of the associated email and attachments to fax files. Notably, randomized processing by the is Rendering server 330 may be realized using the RNG function with the x and y parameters defined by the amount of the email headers. For example, in an environment wherein the amount of email headers organized in the Email2Fax data set 364 is twenty-five (25), the Rendering server 330 may sequentially assign each of the twenty-five email headers a number between 1 and 25. The Rendering server 330 may then invoke the RNG function to retrieve a predetermined number of random values, e.g., twenty-five (25) values, between x=1 and y=25, inclusive. That is, the Rendering server 330 may retrieve the random values returned by the function, whereby the retrieved values identify the random order in which the email headers are accessed.

The Rendering server 330 then retrieves the attachments associated with the email headers from the file server 380 and converts the attachments to a file format, such as the tagged image file format (TIFF), suitable for fax transmission over the computer networks. Preferably, the Rendering server 330 creates a different TIFF file for each attachment. In other embodiments, the Rendering server 330 may create a single TIFF file for all attachments associated with each email. In addition, the Rendering server stores the TIFF files ("faxes") in the file server 380, deletes the associated attachments from the file server 380, creates fax headers for storage in a second data set, e.g., the FaxOut data set 366, of database 360 and deletes associated email headers from the Email2Fax data set 364.

The Fax assembler 340 monitors (e.g., periodically) the FaxOut data set 366 and, upon discovering the newly-stored fax headers, retrieves those headers in random order to ensure fair and impartial processing of the headers for transmission of associated faxes over the networks. The randomized retrieval and processing may again be realized using the RNG function with the x and y parameters defined by, in this instance, the amount of the fax headers. For example, in an environment wherein the amount of fax headers organized in the FaxOut data set 366 is twenty-five (25), the Fax assembler 340 may sequentially assign each of the twenty-five fax headers a number between 1 and 25. The Fax assembler may then invoke the RNG function to retrieve a predetermined number of random values, e.g., twenty-five (25) values, between x=1 and y=25, inclusive. That is, the Fax assembler 340 may retrieve the random values returned by the function, is whereby the retrieved values identify the random order in which the fax headers are accessed.

The Fax assembler 340 then retrieves the faxes associated with the fax headers from the file server 380 (preferably in the same order by which the fax headers were accessed) and randomly organizes the faxes by customer for transmission over the networks. The Fax assembler 340 polls (e.g., periodically) the FaxOut data set 366 to determine which faxes are ready for transmission and, based on the poll, which customers are transmitting those faxes. The Fax assembler 340 may randomly organize these faxes and customers according to a variety of arrangements.

According to one arrangement, the Fax assembler 340 may randomly organize the faxes in multiple stages using the RNG function with the x and y parameters defined by the amount of the faxes and customers. For this arrangement, the customers of the faxes are serviced in a random order and the faxes associated with each customer are serviced in a random order. In a first stage of randomization, the Fax assembler 340 may randomly order all of the faxes associated with each customer. For example, wherein the amount of faxes requested for transmission for a particular customer is twenty-five (25), the Fax assembler may sequentially assign each of the twenty-five faxes a number between 1 and 25. The Fax assembler 340 may then invoke the RNG function to retrieve a predetermined number of random values, e.g., twenty-five (25) values, between x=1 and y=25, inclusive, such that the random values returned by the function identify the random order in which the faxes are transmitted. In a second stage of randomization, the Fax assembler may randomly order the customers themselves. For example, wherein the amount of customers requesting transmission of their faxes is, e.g., five (as indicated by FaxOut data set 366), the Fax assembler 340 may sequentially assign each of the five customers a number between 1 and 5 and then invoke the RNG function to retrieve a predetermined number of random values, e.g., five (5) values, between x=1 and y=5, inclusive, such that the random values returned by the function identify the random order in which each customer's fax requests are transmitted. It will be apparent to those skilled in the art that the two stages of randomization described above may be implemented in any order, or even in parallel, because each stage does not depend upon the other.

The Fax assembler 340 may then iterate through the randomly ordered customers and, for each customer, process the first of the randomly ordered faxes associated with that customer. Once it has iterated through all of the randomly ordered customers, the Fax assembler 340 may re-iterate through the randomly ordered customers and process, to the extent they exist, the second of the randomly ordered faxes associated with each customer. This process illustratively continues until all of the faxes have been processed. Advantageously, the multi-stage randomization arrangement ensures that no customer is favored over any other customer because all customers have an equal chance of having their faxes transmitted first.

Alternatively, the Fax assembler 340 may randomly organize the faxes in a single stage arrangement using the RNG function with the x and y parameters defined by the amount of faxes. For this arrangement, the faxes associated with all customers are serviced in a random order; consequently, there is no way to predetermine the order in which the faxes are processed. For example, at the single randomization stage wherein the amount of faxes requested for transmission for the customers is twenty-five (25), the Fax assembler may sequentially assign each of the twenty-five faxes a number between 1 and 25. The Fax assembler 340 may then invoke the RNG function to retrieve a predetermined number of random values, e.g., twenty-five (25) values, between x=1 and y=25, inclusive, such that the random values returned by the function identify the random order in which the faxes are transmitted.

According to one or more embodiments, the Fax assembler 340 may be configured to generate other images associated with the randomly organized faxes, such as cover pages with, inter alia, the senders' contact information, the number of pages being transmitted, the senders' notes, and other relevant information. The Fax assembler 340 may be further configured to generate headers and footers for subsequent pages (i.e., the attachments) of the faxes, such as to stamp the time and date at which each fax is transmitted, the name of the sender of the fax, the sender's fax number and the page numbers of the fax. Preferably, these additional pages are generated in the same file format as the attachments (e.g., TIFF). The Fax assembler 340 may then render a single is fax document (e.g., a single TIFF file) that contains all of the images for transmission, including without limitation, the cover page and attachments.

Thereafter, the Fax assembler 340 forwards the randomly organized faxes to Fax Resources 390, which illustratively contains logic and circuitry for transmitting the faxes over private service provider network 130 (and, if necessary, public network 120) in accordance with the T.38 fax protocol. The faxes may then be subsequently transmitted over telephone network 110 in accordance with the T.30 fax protocols by, e.g., an IP to PSTN gateway (not shown).

Figure 4:
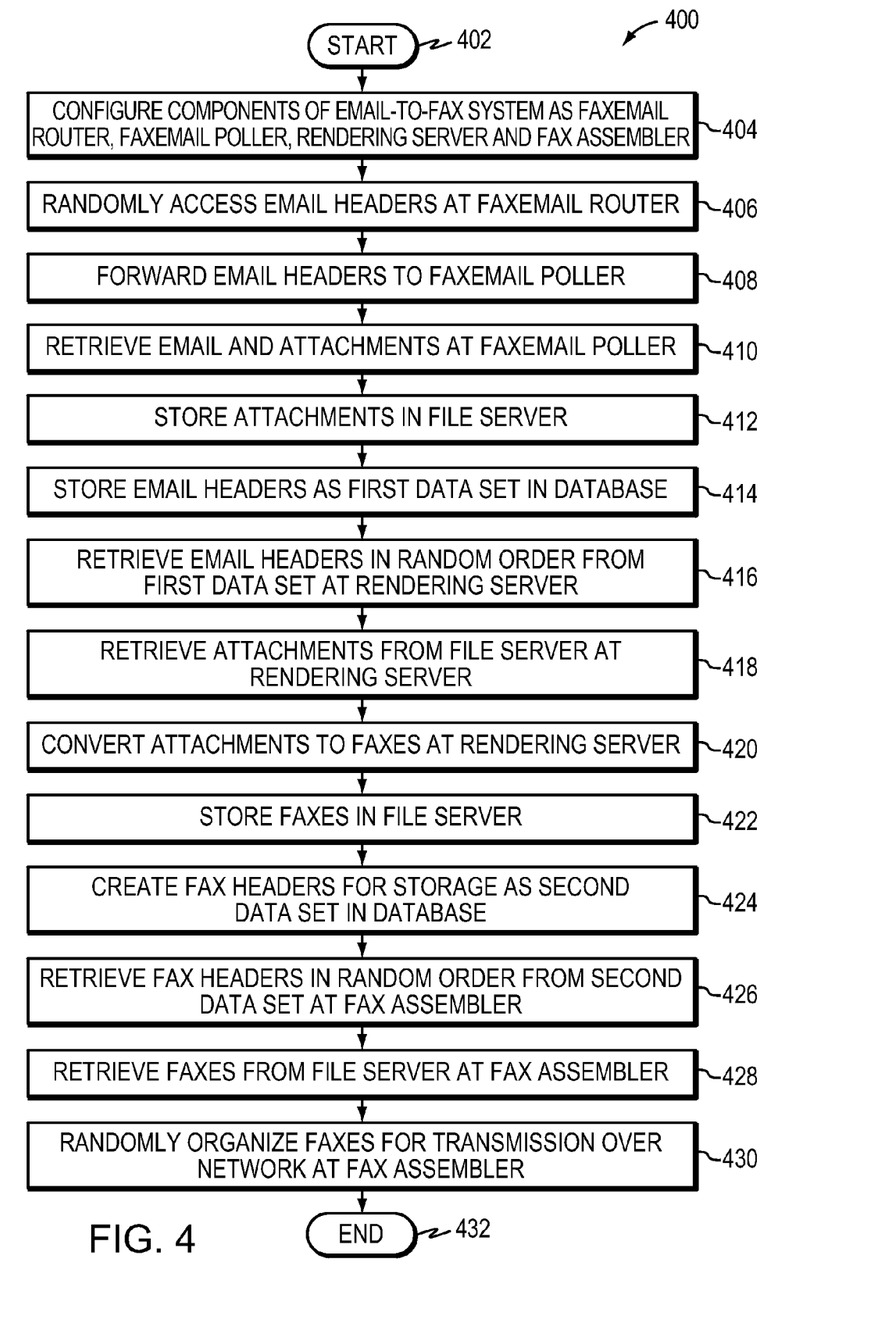
FIG. 4 is a simplified procedure for implementing an email-to-fax processing system in accordance with the present invention.

FIG. 4 is a simplified procedure 400 for implementing an email-to-fax processing system in accordance with the present invention. The procedure starts at step 402 and proceeds to step 404 where a plurality of components of the email-to-fax system are configured to provide email-to-fax processing services over a network, wherein the components include a FaxEmail router, FaxEmail poller, Rendering server and Fax assembler. In step 406, the FaxEmail router randomly accesses email headers from a maildrop on a public email server and, in step 408, forwards those headers to the FaxEmail poller. In step 410, the FaxEmail poller retrieves emails, including any attachments, associated with the headers from the maildrop and, in step 412 stores the attachments in a file server of the system. In step 414, the poller stores the email headers as a first data set in a database of the system.

In step 416, the Rendering server retrieves the email headers in random order from the first data set and, in step 418, retrieves their associated attachments from the file server. In step 420, the Rendering server converts the attachments to faxes and, in step 422, stores the faxes in the file server. In step 424, the Rendering server creates fax headers for storage as a second data set in the database. In step 426, the Fax assembler retrieves the fax headers in random order from the second data set and, in step 428, retrieves their associated faxes from the file server. In step 430, the Fax assembler randomly organizes the faxes (across customers and/or within customers, as described above) for transmission over the network. The Fax assembler may also generate any additional images needed for the fax transmission, such as a cover page and/or is appropriate headers and footers. The procedure then ends at step 432.

The email-to-fax processing system described herein may be advantageously implemented in a variety environments. For example, the system may be implemented in an environment, such as a business organization or enterprise, that is itself a customer, e.g., a consumer, of the email-to-fax processing services. In addition, the email-to-fax processing system may be implemented in an environment, such as a cloud-based service provider, which provides email-to-fax processing services to customers, e.g., subscribers, that purchase the services for delivery over a network.

Advantageously, the email-to-fax processing system described herein efficiently services requests issued by customers of the system in a fair and impartial manner. Specifically, the system reduces the possibility of a particular customer having substantial service demands effectively overwhelming the system with its requests to the detriment of other customer requests. Unlike other implementations that process requests in a defined order, the email-to-fax system allows sharing of its processing resources among the customers in a random fashion to thereby enable servicing of all requests in a fair and efficient manner.

While there have been shown and described illustrative embodiments for efficiently servicing customer requests at an email-to-fax processing system in a fair and impartial manner, it is to be understood that various other adaptations and modifications may be made within the spirit and scope of the embodiments herein. For example, the embodiments have been shown and described herein with relation to multi-stage and single stage random organization arrangements by the Fax assembler using the RNG function with the x and y parameters defined by the amount of the faxes and customers. However, the embodiments in their broader sense are not so limited, and may, in fact, enable a modified multi-stage random organization arrangement using the RNG function with the x and y parameters defined only by an amount of the faxes per customer.

According to this alternate embodiment of the invention, the faxes associated with each customer are serviced in a random order, but the customers may be serviced is according to a certain priority. For example, at a randomization stage wherein the amount of faxes requested for transmission for a particular customer is twenty-five (25), the Fax assembler may sequentially assign each of the twenty-five faxes a number between 1 and 25. The Fax assembler 340 may then invoke the RNG function to retrieve a predetermined number of random values, e.g., twenty-five (25) values, between x=1 and y=25, inclusive, such that the random values returned by the function identify the random order in which the faxes are transmitted. This process is repeated for each customer.

However, at a prioritization stage, the Fax assembler 340 may order the customers using a prioritization algorithm that is non-random. The prioritization algorithm allows the system to implement a policy for ensuring that certain customers, perhaps under certain conditions, are preferred over other customers. One preferred example may be ordering the customers by the last time at which their faxes were transmitted using the system (i.e., giving a lowest priority to those who have used the system most recently). Another example may be ordering the customers by the number of their faxes transmitted using the system since a particular time (i.e., giving a lower priority to those who have used the system the most). Yet another example may be ordering the customers according to a level of service they have purchased (e.g., allowing customers to pay for higher priority fax service). As for the latter example, an indication of the level of service purchased by each customer may be stored in database 360 to enable transmission of the customers' faxes according to the ordering policy associated with that level of service. It will be apparent to those skilled in the art that the modified two stage arrangement described above may be implemented in any order, or even in parallel, because each stage does not depend upon the other.

The Fax assembler 340 may then iterate through the prioritized customers and, for each customer, process the first of the randomly ordered faxes associated with that customer. Once it has iterated through all of the prioritized customers, the Fax assembler 340 may re-iterate through the prioritized customers and process, to the extent they exist, the second of the randomly ordered faxes associated with each customer. This process is illustratively continues until all of the faxes have been processed. Advantageously, the modified multi-stage random organization arrangement enables control by the email-to-fax processing system over the order in which customers are serviced, e.g., to achieve a business, technological or other objective, while ensuring that for a customer, each fax has an equal chance of being transmitted first.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

configuring a plurality of components of an email-to-fax processing system to provide email-to-fax processing services over a network, wherein the components include a FaxEmail router, a FaxEmail poller, a Rendering server and a Fax assembler;

randomly accessing email headers from a maildrop on a public email server at the FaxEmail router prior to forwarding the email headers to the FaxEmail poller;

retrieving emails, including attachments, associated with the email headers from the maildrop at the FaxEmail poller;

converting the attachments to faxes at the Rendering server;

storing the faxes in a file server and fax headers in a first data set of a database at the Rendering server;

retrieving the fax headers in random order from the first data set and the faxes from the file server at the Fax assembler; and randomly organizing the faxes for transmission over the network at the Fax assembler.

2. The method of claim 1 wherein randomly accessing the email headers comprises:

using a random number generation (RNG) function to realize the random access, wherein parameters of the RNG function are dependent upon an operating environment of the email-to-fax processing system.

3. The method of claim 1 wherein randomly accessing the email headers comprises:

querying a directory of the system to determine an address of the FaxEmail poller by an email address of a sender of the email headers; and if the email address of the sender is not stored in the directory, discarding the email headers.

4. The method of claim 3 wherein querying the directory comprises:

querying the directory using a public address.

5. The method of claim 1 wherein randomly accessing the email headers comprises:

forwarding the email headers to the FaxEmail poller using a public address of the FaxEmail poller.

6. The method of claim 1 further comprising:

storing the attachments in the file server of the system and the email headers as a second data set in the database of the system; and retrieving the email headers in random order from the second data set and the attachments from the file server at the Rendering server.

7. The method of claim 6 wherein storing the attachments comprises:

storing the email headers as the second data set to enable efficient access and manipulation by the components of the system.

8. The method of claim 6 wherein retrieving the email headers in random order comprises:

monitoring the second data set; and upon discovering the email headers, processing the email headers in random order.

9. The method of claim 8 wherein processing the email headers comprises:

using a random number generation (RNG) function to realize the random processing of email headers, wherein parameters of the RNG function are defined by an amount of the email headers.

10. The method of claim 1 wherein converting the attachments comprises:

converting the attachments to a file format suitable for fax transmission over the network.

11. The method of claim 10 wherein the file format is a tagged image file format.

12. The method of claim 1 wherein storing the faxes in the file server comprises:

deleting the attachments from the file server and email headers from the second data set.

13. The method of claim 1 wherein retrieving the fax headers in random order comprises:

monitoring the first data set; and upon discovering the fax headers, processing the fax headers in random order.

14. The method of claim 13 wherein processing the fax headers comprises:

using a random number generation (RNG) function to realize the random processing of fax headers, wherein parameters of the RNG function are defined by an amount of the fax headers.

15. The method of claim 1 wherein randomly organizing the faxes comprises:

randomly organizing the faxes according to a single-stage arrangement that uses a random number generation (RNG) function, wherein parameters of the RNG function are defined by an amount of the faxes.

16. The method of claim 1 wherein randomly organizing the faxes further comprises:

randomly organizing the faxes according to a multi-stage arrangement that uses a random number generation (RNG) function, wherein parameters of the RNG function are defined by an amount of the faxes and customers.

17. The method of claim 1 wherein configuring the plurality of components comprises:

configuring the FaxEmail router and FaxEmail poller to provide email storage and retrieval services;

configuring the Rendering server to provide email-to-fax conversion services; and configuring the Fax assembler to provide fax organizational transmission services.

18. The method of claim 1 wherein configuring the plurality of components comprises:

embodying computers executing software processes and services as the FaxEmail router, the FaxEmail poller, the Rendering server and the Fax assembler.

19. The method of claim 1 wherein randomly organizing the faxes comprises:

generating cover pages, headers and footers at the Fax assembler.

20. A system comprising:

a plurality of computer nodes embodied as a FaxEmail router, a FaxEmail poller, a Rendering server and a Fax assembler, each computer node having one or more network interfaces coupled to one or more networks and a memory configured to store software executable by the computer node, the software when executed operable to:

randomly access email headers from a maildrop on a public email server at the FaxEmail router prior to forwarding the email headers to the FaxEmail poller;

retrieve emails, including attachments, associated with the email headers from the maildrop at the FaxEmail poller;

convert the attachments to faxes at the Rendering server;

store the faxes in a file server and fax headers in a first data set of a database at the Rendering server;

retrieve the fax headers in random order from the first data set and the faxes from the file server at the Fax assembler; and randomly organize the faxes for transmission over the network at the Fax assembler.

21. The system of claim 20 wherein the software when executed is further operable to:

store the attachments in the file server of the system and the email headers as a second data set in the database of the system; and retrieve the email headers in random order from the second data set and the attachments from the file server at the Rendering server.

22. The system of claim 20 wherein the software when executed to randomly organize the faxes is further operable to:

generate cover pages, headers and footers.

23. The system of claim 20 wherein the plurality of computer nodes are further embodied as data storage facilities, including a database, a directory and a file server.

24. The system of claim 23 wherein:

the FaxEmail router is hosted and maintained within a public network;

the FaxEmail poller, Rendering server and Fax assembler are hosted and maintained within a private service provider network; and the data storage facilities are hosted and maintained in the private service provider network.

25. The system of claim 23 wherein:

the FaxEmail router, FaxEmail poller, Rendering server and Fax assembler are hosted and maintained within a private service provider network;

the database and file server are hosted and maintained within the private service provider network; and the directory is hosted and maintained in a public network.

26. The system of claim 20 wherein the network interface comprises:

mechanical, electrical and signaling circuitry to connect the node to the network.

* * * * *

UNITED STATES PATENT AND TRADEMARK OFFICE
CERTIFICATE OF CORRECTION

PATENT NO.        : 8,855,273 B1
APPLICATION NO.   : 13/235084
DATED             : October 7, 2014
INVENTOR(S)       : Vlad Vendrow Page 1 of 1

It is certified that error appears in the above-identified patent and that said Letters Patent is hereby corrected as shown below:

In the Specification

Col. 1, line 23, after "emails" delete "is".

Col. 3, line 9, after "that" delete "is";
Col. 3, line 50, after "on" delete "is".

Col. 5, line 39, after "with" delete "is".

Col. 6, line 57, after "the" delete "is".

Col. 7, line 33, after "function," delete "is".

Col. 8, line 51, after "single" delete "is".

Col. 9, line 24, after "and/or" delete "is".

Signed and Sealed this
Third Day of March, 2015

Michelle K. Lee
*Deputy Director of the United States Patent and Trademark Office*